United States Patent [19]

Kawai et al.

[11] Patent Number: 4,481,131
[45] Date of Patent: Nov. 6, 1984

[54] ELECTROCONDUCTIVE RESIN COMPOSITION

[75] Inventors: Yoichi Kawai; Yoshihisa Gotoh, both of Yokohama; Masami Maki, Kawasaki; Sachio Yokote, Yokohama; Katsumi Sekiguchi, Tokyo; Katsuyoshi Sasagawa; Masao Imai, both of Yokohama, all of Japan

[73] Assignee: Mitsui Toatsu Chemicals, Inc., Tokyo, Japan

[21] Appl. No.: 347,997

[22] Filed: Feb. 11, 1982

[30] Foreign Application Priority Data

Mar. 2, 1981 [JP] Japan ............................. 56-28413
Sep. 21, 1981 [JP] Japan ............................ 56-147972
Nov. 6, 1981 [JP] Japan ............................ 56-177080

[51] Int. Cl.$^3$ .......................................... H01B 1/06
[52] U.S. Cl. .................................. 252/511; 252/500; 252/506; 524/80; 524/250; 524/392; 525/350; 525/346; 525/382; 525/385
[58] Field of Search ................... 524/80, 250, 392; 252/511, 519, 518, 521, 510; 525/351, 346, 359.1, 370, 381, 385, 382, 350, 370, 366

[56] References Cited

U.S. PATENT DOCUMENTS

| | | | |
|---|---|---|---|
| 2,582,510 | 1/1952 | Stiratelli | 524/80 |
| 2,982,756 | 5/1961 | Mercier et al. | 524/80 |
| 3,436,370 | 4/1969 | Blumel et al. | 524/250 |
| 3,468,855 | 9/1969 | Hunter | 525/350 |
| 4,278,510 | 7/1981 | Chien et al. | 524/584 |
| 4,281,085 | 7/1981 | Ikeda et al. | 525/381 |

FOREIGN PATENT DOCUMENTS

60349 4/1979 Japan.
58236 4/1980 Japan.

*Primary Examiner*—Josephine L. Barr
*Attorney, Agent, or Firm*—Fisher, Christen & Sabol

[57] ABSTRACT

An electroconductive polyolefin composition comprising (1) 100 parts by weight of a polyolefin resin, (2) 10 to 60 parts by weight of carbon black, (3) 0.1 to 6 parts by weight of sulfur and (4) at least 0.1 part by weight of one or two specified accelerators, and optionally containing 5 to 60 parts by weight of atactic polypropylene.

6 Claims, No Drawings

ELECTROCONDUCTIVE RESIN COMPOSITION

TECHNICAL FIELD

This invention relates to an electroconductive resin composition which can be directly electroplated to provide a metal coating of excellent adhesion. More specifically, this invention relates to an electroconductive resin composition comprising (1) a polyolefin resin, (2) carbon black, (3) sulfur and (4) one or two specified accelerators, which has excellent direct electroplatability and permits formation of a plated layer having uniform and good adhesion.

PRIOR ART

Polyolefin resins have previously been used also as base materials of plated articles, but since they are nonelectric conductors, they cannot be directly electroplated. Hence, electroplating of the polyolefin resins has been carried out after subjecting them to complex pre-treating steps such as degreasing by dipping in a warm alkaline solution, pre-etching by dipping in an organic solvent solution, etching by dipping in mixed chromic acid, sensitizing by dipping in an HCl-acidified solution of stannous chloride, activating by dipping in an HCl-acidified solution of palladium chloride, and electroless nickel plating by dipping in an alkaline or acidic nickel plating bath. Various attempts have therefore been made to omit these complex pre-treating steps and to perform electroplating directly on shaped articles of polyolefin resins.

One attempt is directed to a method which involves adding carbon black to a thermoplastic resin such as a polyolefin resin to render it electrically conductive and then performing electroplating directly on the resulting electroconductive resin. Although this method gives a plated metal coating, it is of no practical use because there is scarcely any adhesion between the metal coating and the resin base.

As another attempt, Japanese Laid-Open Patent Publication No. 60349/1979 suggests a composition comprising a polyolefin resin, 25 to 41% of electrically conductive carbon black, 0.15 to 15% of sulfur, 0 to 7% of zinc oxide and 0.2 to 1.5% of mercaptobenzothiazole or mercaptobenzothiazyl disulfide. This composition, however, has the defects that the molding characteristics of the resin composition are poor and flow marks are seen to form on the surface of large-sized molded articles resulting in much impairment of the appearance of a plated layer formed thereon, and that much bleeding of compounding ingredients, particularly mercaptobenzothiazole, etc. occurs on the surface of the molded article. Although an adhesion between the plated layer and the resin base can be obtained, it is not uniform or good.

Methods have also been suggested which involve the addition of a vulcanization accelerator instead of the mercaptobenzothiazole or mercaptobenzothiazyl disulfide in the aforesaid composition, but they have similar defects.

SUMMARY OF THE INVENTION

The present inventors have made various investigations in order to remedy the aforesaid defects. These investigations have led to the discovery that an electroconductive resin composition comprising (1) 100 parts by weight of a polyolefin resin, (2) 10 to 60 parts by weight of carbon black, (3) 0.1 to 6 parts by weight of sulfur and (4) at least 0.1 part by weight of one or two accelerators selected from compounds (i) to (iv) specified below has good direct electroplatability; that no bleeding of the compounding ingredients on the surface of a molded article of the composition is observed; and that a plated layer on the molded article has uniform and good adhesion to any part of the surface of the molded article.

(i) Thiophenol derivatives of the general formula

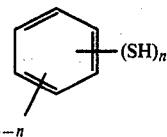

(1)

wherein X represents a hydrogen atom, a halogen atom, or a lower alkyl group and n represents an integer of 1 to 3;

(ii) Metal complexes of said thiphenol derivatives with at least one metal selected from the group consisting of iron, magnesium and zinc;

(iii) Compounds of the general formula

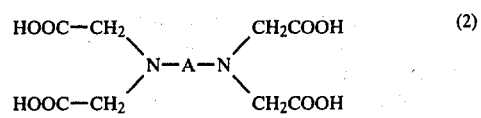

(2)

wherein A represents any one of;

(a) $-(CH_2CH_2)_m-$ in which m represents an integer of 1 to 9,

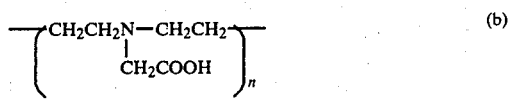

(b)

in which n represents an integer of 1 to 5,

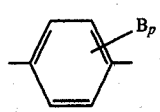

(c)

in which B represents a hydrogen, chlorine, or bromine atom, or a methyl or nitro group, and p represents an integer of 1 to 4, and

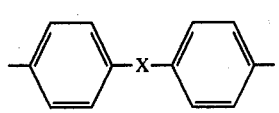

(d)

in which X represents an oxygen or sulfur atom, or a methylene, imino or sulfuryl group.

DETAILED DESCRIPTION OF THE INVENTION

Examples of the polyolefin resin used in this invention include polypropylene-type resins such as a propylene homopolymer, an ethylene/propylene copolymer, an ethylene/propylene random copolymer rubber, and an ethylene/propylene non-conjugated diene copolymer rubber, polyolefin resins selected from polyethylene and polyisobutylene, and blends of two or more of these polyolefin resins. Among these, the use of the ethylene/propylene copolymer and the joint use of the propylene homopolymer or ethylene/propylene copolymer and the ethylene/propylene random copolymer rubber are preferred.

Generally, when carbon black is added to a polyolefin resin, the resulting composition has decreased flowability. Accordingly, in the present invention, it is preferred to use polyolefin resins having a melt flow index (determined by ASTM D-1238; to be abbreviated as MI hereinafter) of at least 20.

Carbon blacks sold generally on the market can be used in the present invention, and there is no particular restriction on the type of carbon black used. Examples are acetylene black obtained by the acetylene method, furnace black obtained by the furnace black method, thermal black by the natural gas thermal method, lump black, and conductive carbon black. The conductive carbon black is especially preferred in view of its electrical conductivity and flowability. The amount of the carbon black added is 10 to 60 parts by weight, preferably 10 to 40 parts by weight, per 100 parts by weight of the polyolefin resin. When the amount of the carbon black exceeds 60 parts by weight, the resulting composition gives too hard a molded article and the flowability of the composition during molding is inferior. When the amount of carbon black is less than 10 parts by weight, the composition has too high an electric resistance and its electroplatability is reduced.

Sulfur used in this invention may be in any form if it is elemental. Powdery sulfur is convenient to use. The amount of sulfur added is 0.1 to 6 parts by weight, preferably 0.3 to 5 parts by weight, on the same basis. When the amount is less than 0.1 part by weight, the adhesion of the plated layer decreases. When the amount exceeds 6 parts by weight, the adhesion of the plated layer similarly decreases.

The thiophenol derivatives of general formula (1) include monothiol compounds in which X is a halogen atom, such as 2,3,5,6-tetrachlorobenzene-thiol, 2,3,5,6-tetrabromobenzene-thiol, pentachlorobenzene-thiol and pentabromobenzene-thiol; dithiol compounds in which X is a halogen atom, such as 3,4,5,6-tetrachlorobenzene-1,2-dithiol, 3,4,5,6-tetrabromobenzene-1,2-dithiol, 4-chlorobenzene-1,2-dithiol and 4-bromobenzene-1,2-dithiol; and dithiol compounds in which X is a hydrogen atom or a lower alkyl group, preferably an alkyl group having 1 to 5 carbon atoms, such as benzene-1,2-dithiol, 4-methylbenzene-1,2-dithiol and 3,4,5,6-tetramethylbenzene-1,2-dithiol. Of these pentachlorobenzenethiol, 3,4,5,6-tetrachlorobenzene-1,2-dithiol and 4-methylbenzene-1,2-dithiol are especially preferred.

The amount of the thiophenol to be added in the electroconductive resin composition of this invention is 0.1 to 4 parts by weight, preferably 0.2 to 2 parts by weight, per 100 parts by weight of the polyolefin resin. If the amount is less than 0.1 part by weight, the adhesion of a plated layer to the resin composition is reduced, and the adhesion strength is non-uniform and varies from part to part of a molded article of the composition, thus showing no practical utility. Even when the amount of the thiophenol derivative exceeds 4 parts by weight, no further improvement in adhesion or the uniformity of adhesion strength is noted.

Examples of the metal complexes of the thiophenol derivatives of formula (1) with iron, magnesium or zinc include metal complexes of monothiol compounds of formula (1) in which X is a halogen atom, such as metal complexes of 2,3,5,6-tetrachlorobenzene-thiol, 2,3,5,6-tetrabromobenzene-thiol, pentachlorobenzene-thiol and pentabromobenzene-thiol; metal complexes of dithiol compounds of formula (1) in which X is a halogen atom, such as metal complexes of 3,4,5,6-tetrachlorobenzene-1,2-dithiol, 3,4,5,6-tetrabromobenzene-1,2-dithiol, 4-chlorobenzene-1,2-dithiol and 4-bromobenzene-1,2-dithiol; and metal complexes of dithiol compounds of formula (1) in which X is a hydrogen atom or a lower alkyl group, preferably an alkyl group having 1 to 5 carbon atoms, such as metal complexes of benzene-1,2-dithiol, 4-methylbenzene-1,2-dithiol and 3,4,5,6-tetramethylbenzene-1,2-dithiol. Of these the metal complexes of pentachlorobenzene-thiol, 3,4,5,6-tetrachlorobenzene-1,2-dithiol and 4-methylbenzene-1,2-dithiol are especially preferred.

The amount of the metal complex of the thiophenol derivative to be used in the electroconductive resin composition of this invention is 0.1 to 4 parts by weight, preferably 0.2 to 2 parts by weight, per 100 parts by weight of the polyolefin resin. If the amount is less than 0.1 part by weight, the adhesion of a plated layer to the composition is reduced and the adhesion strength becomes non-uniform and varies from part to part of a molded article of the composition, showing no practical utility. Even when the amount of the metal complex exceeds 4 parts by weight, no further improvement in adhesion or the uniformity of adhesion strength is noted.

Examples of compounds of general formula (2) in which the group A represents $-(CH_2CH_2)_{\overline{m}}$ (m is as defined hereinabove) are ethylenediaminetetraacetic acid (m=1), hexamethylenediaminetetraacetic acid (m=3), octadecylenediaminetetraacetic acid (m=9) and metal salts of these compounds.

Examples of compounds of general formula (2) in which the group A is

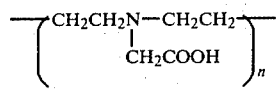

(n is as defined hereinabove) are diethylenetriaminepentaacetic acid (n=1), pentaethylenehexamineoctaacetic acid (n=5) and metal salts of these compounds.

Examples of compounds of general formula (2) in which the group A is

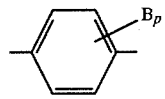

(B and p are as defined hereinabove) are phenylenediaminetetraacetic acid, chlorophenylenediaminetetraacetic acid, tolylenediaminetetraacetic acid, and metal salts of these.

Examples of compounds of general formula (2) in which the group A represents

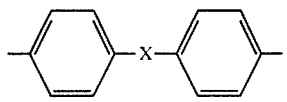

(X is as defined hereinabove) are, for example, N,N'-tetrakis-carboxymethyl diphenyl ether, N,N'-tetrakis-carboxymethyl diphenyl sulfone, and metal salts of these compounds.

The metal salts may include, for example, alkali metal salts such as sodium and potassium salts.

Among the compounds of formula (2), ethylenediaminetetraacetic acid, diethylenetriaminepentaacetic acid and metal salts of these are especially preferred.

The amount of the compound of formula (2) or its salt used in the electroconductive resin composition of this invention is at least 0.1 part by weight per 100 parts by weight of the polyolefin resin. If the amount is less than 0.1 part by weight, the adhesion of a plated layer to the composition is reduced, and the adhesion strength is nonuniform varying from part to part in a molded article of the composition. There is no particularly critical upper limit to the amount of the compound of formula (2) or its metal salt. But when it exceeds 6 parts by weight, no further improvement in adhesion or the uniformity of adhesion strength is noted. The preferred amount is in the range of 0.1 to 5 parts by weight, more preferably 0.1 to 4 parts by weight.

Mixing of the individual ingredients in the production of the electroconductive resin composition of this invention is performed by melt-extrusion using a single-screw extruder, a twin-screw extruder, etc., which are generally used in the art. As required, the composition is pelletized. Preferably, the extruding temperature is set as low as possible in order to avoid heat decomposition of the resin. In producing this composition, there may be further added a phenolic antioxidant such as tetrakis-[methylene-3-(3',5'-di-t-butyl-4'-hydroxyphenyl)propionate]methane and 2,6-di-t-butyl-p-cresol as a stabilizer to oxygen and heat, a metal deterioration inhibitor such as melamine, a filler, a slip agent, a blowing agent and a fire retardant such as antimony dioxide and halogenated hydrocarbons which are generally used for polyolefin resins in the art. Preferably, 5 to 60 parts by weight of atactic polypropylene may also be added to the polyolefin resin composition in order to increase its flowability during molding and to shorten the time during which a molded article after molding is left to stand before it is electroplated.

The electroconductive resin composition of this invention has an electric resistance of usually not more than $10^3$ ohms although it may vary depending upon the types of the polyolefin resin, carbon black, etc., used. In view of operability in plating, the electrical resistance of the resin composition is preferably not more than 300 ohms.

The resin composition of this invention so obtained can be molded into a desired molded article by various molding methods such as injection molding, extrusion molding and compression molding.

Plating of a molded article formed from the electroconductive resin composition of this invention is carried out, for example, by washing it with a weak alkaline detergent and water, first electroplating the washed article from a Watts bath at a low voltage, for example for 3 minutes at 1 volt, and for 3 minutes at 1.5 volts, and then electroplating it under ordinary electroplating conditions. For example, it is possible to perform nickel strike plating to a thickness of 3 μm, copper plating to a thickness of 10 μm, then nickel plating to a thickness of 10 μm, and chrome plating to a thickness of 0.1 μm in each layer. The plated coatings so formed on the molded article of the composition of this invention have uniform and very good adhesion, and show sufficient durability against a heat cycle test.

The electric resistance of the resin is determined by measuring the resistance of a 1 cm-interval of the surface of a molded article by means of a tester. The adhesion strength between the plated coating and the resin is determined by providing cuts with a width of 1 cm in the plated layer, peeling the plated layer from the resin layer in a direction at an angle of 180°, and measuring the peel strength at the time of peeling by means of a tensile tester at a stretching speed of 30 mm/min. The heat cycle test is a method of evaluating the adhesion of a plated coating which comprises maintaining a plated test sample for 2 hours in a constant temperature chamber kept at 85° C., then allowing it to stand in the chamber until the temperature of the chamber is lowered to room temperature, then maintaining it for 2 hours at −30° C., allowing it to stand until the temperature rises to room temperature, and repeating this heating-cooling cycle 10 times, and thereafter observing the plated surface of the sample for the occurrence of cracks, blisters, etc.

The following examples illustrate the present invention more specifically:

EXAMPLES 1 TO 4

An ethylene/propylene copolymer (BJ4H, a trade name for a product of Mitsui Toatsu Chemicals, Inc.; MI 20 g/10 min.) as a polyolefin resin, Ketjen Black (a trade name of Lion-Akzo Co., Ltd.) as conductive carbon black, sulfur, a thiophenol derivative (pentachlorobenzenethiol, 3,4,5,6-tetrachlorobenzene-1,2-dithiol or 4-methylbenzene-1,2-dithiol), and atactic polypropylene (made by Mitsui Toatsu Chemicals, Inc.) were mixed in the proportions shown in Table 1 by the Henschel mixer. The mixture was kneaded and pelletized by an extruder. The pellets were molded by an injection molding machine into flat plates each having a size of 80 mm × 160 mm with a thickness of 2 mm. The electric resistances of the flat plates were measured, and the results are shown in Table 1.

Each of the flat plates was electroplated at 1 A/dm$^2$ for 5 minutes in a Watts bath at a pH of 4.2 containing 280 g/l of Ni(SO$_4$)$_2$.6H$_2$O, 50 g/l of NiCl$_2$.6H$_2$O and 45 g/l of boric acid. It was further subjected to copper plating at 2.8 A/dm$^2$ for 90 minutes in a copper plating bath containing 220 g/l of Cu(SO$_4$)$_2$.5H$_2$O and 55 g/l of H$_2$SO$_4$ to obtain a copper-plated layer having a thickness of 50 μm. Four cuts each having a length of 6 cm and a width of 1 cm were made parallel to each other at intervals of 3 cm on the resulting electroplated sample starting at its gate portion, and the adhesion strength of the plated layer to the flat resin plate was measured. The results are shown in Table 1. The electroplated samples were also subjected to a heat cycle test consisting of ten cooling-heating cycles. The results are also shown in Table 1.

COMPARATIVE EXAMPLE 1

Pellets were produced and molded into a flat plate in the same way as in Example 1 except that pentachlorobenzene-thiol was not used. The flat plate was subjected to nickel plating and copper plating under the same conditions as in Example 1, and the adhesion strength of the plated layer with respect to the resin article was measured by the same method as in Example 1. Furthermore, the electroplated sample was subjected to the same heat cycle test as in Example 1. The electric resistances of the flat plate was also measured. The results are shown in Table 1.

COMPARATIVE EXAMPLE 2

Pellets were produced and molded into a flat plate in the same way as in Example 1 except that mercaptobenzothiazole was added instead of pentachlorobenzenethiol. The flat plate was subjected to nickel plating and copper plating under the same conditions as in Example 1, and the adhesion strength of the plated layer with respect to the resin article was measured by the same method as in Example 1. The electroplated sample was also subjected to the same heat cycle test as in Example 1. The electric resistance of the flat plate was also measured. The results are shown in Table 1.

TABLE 1

| | | Example | | | | Comparative Example | |
|---|---|---|---|---|---|---|---|
| | | 1 | 2 | 3 | 4 | 1 | 2 |
| Composition (parts by weight) | | | | | | | |
| BJ4H | | 100 | 100 | 100 | 100 | 100 | 100 |
| Ketjen Black | | 18 | 18 | 18 | 18 | 18 | 18 |
| Atactic polypropylene | | 20 | 20 | 20 | 20 | 20 | 20 |
| Sulfur | | 1.0 | 1.0 | 1.0 | 1.0 | 1.0 | 1.0 |
| Pentachlorobenenethiol | | 1.0 | — | — | — | — | — |
| 3,4,5,6-tetrachlorobenzene-1,2-dithiol | | — | 0.5 | 1.0 | — | — | — |
| 4-methylbenzene-1,2-dithiol | | — | — | — | 1.0 | — | — |
| Mercaptobenzothiazole | | — | — | — | — | — | 1.0 |
| Electric resistance (ohms) | | 115 | 100 | 120 | 110 | 120 | 130 |
| Adhesion strength of the plated layer (kg/cm) (from the gate side) | No. 1 | 2.3 | 2.7 | 2.8 | 2.3 | 0 | 0.7 |
| | No. 2 | 2.2 | 2.8 | 3.0 | 2.1 | 0 | 0.9 |
| | No. 3 | 2.3 | 2.9 | 3.0 | 2.2 | 0 | 1.5 |
| | No. 4 | 2.4 | 2.8 | 2.8 | 2.2 | 0 | 1.0 |
| Heat cycle test | | No change occurred. | | | | Plated layer peeled. | Many blisters occurred in the plated layer. |

EXAMPLE 5

In this Example, 60 parts by weight of a propylene homopolymer (J4H, a trade name for a product of Mitsui Toatsu Chemicals, Inc.; MI 20 g/10 min.) and 40 parts by weight of an ethylene-propylene random copolymer (Toughmer PO280, a trade name for a product of Mitsui Toatsu Chemicals, Inc.) were used in place of the resin used in Example 3.

The Electric resistance of the flat plate obtained by this Example was 105 ohms and the adhesion strength of the electroplated layer was 2.3, 2.2, 2.2 and 2.3 respectively from the gate portion.

In the cooling-heating cycle test, no change was noted in the plated surface of the sample.

EXAMPLE 6

In this Example, 80 parts by weight of an ethylene-propylene copolymer (BJ4H, a trade name for a product of Mitsui Toatsu Chemicals, Inc.; MI 20 g/10 min.) and 20 parts by weight of an ethylene-propylene copolymer (Toughmer PO280, a trade name for a product of Mitsui Toatsu Chemicals, Inc.) were used instead of the resin used in Example 3.

The resulting flat plate had an electric resistance of 110 ohms. The adhesion strength of the plated layer was 2.2, 2.3, 2.3 and 2.3 respectively from the gate portion. In the cooling-heating cycle test, no change was noted in the plated surface of the sample.

EXAMPLES 7 TO 12

An ethylene/propylene copolymer (BJ4H, a trade name for a product of Mitsui Toatsu Chemicals, Inc.; MI 20 g/10 min.) as a polyolefin resin, Ketjen Black (a trade name of Lion-Akzo Co., Ltd.) as a conductive carbon black, sulfur, a metal complex of thiophenol derivative (a magnesium complex of pentachlorobenzene-thiol, an iron complex of 3,4,5,6-tetrachlorobenzene-1,2-dithiol or a zinc complex of 4-methylbenzene-1,2-dithiol), and atactic polypropylene (a product of Mitsui Toatsu Chemicals, Inc.) were mixed in the proportions shown in Table 2 by the Henschel mixer. The mixture was kneaded and pelletized by an extruder. The pellets were molded by an injection molding machine into flat plates each having a size of 80 mm × 160 mm with a thickness of 2 mm. The electric resistances of these plates were measured, and the results are shown in Table 2.

Each of the flat plates was electroplated at 1 A/dm$^2$ for 5 minutes in a Watts bath at a pH of 4.2 containing 280 g/l of Ni(SO$_4$)$_2$.6H$_2$O, 50 g/l of NiCl$_2$.6H$_2$O and 45 g/l of boric acid to form a nickel-plated layer. It was further subjected to copper plating at 2.8 A/dm$^2$ for 90 minutes in a copper plating bath containing 220 g/l of Cu(SO$_4$)$_2$.5H$_2$O and 55 g/l of H$_2$SO$_4$ to form a copper-plated layer having a thickness of 50 μm. Four cuts each having a length of 6 cm and a width of 1 cm were made parallel to each other at intervals of 3 cm in the resulting electroplated samples, and the adhesion strength of the plated layer was measured. The results are shown in Table 2. The electroplated samples were also subjected to a heat cycle test consisting of 10 cooling-heating cycles. The results are also given in Table 2.

TABLE 2

| | | Example | | | | | |
|---|---|---|---|---|---|---|---|
| | | 7 | 8 | 9 | 10 | 11 | 12 |
| Composition (parts by weight) | | | | | | | |
| Ethylene/propylene copolymer (BJ4H) | | 100 | 100 | 100 | 100 | 100 | 100 |
| Ketjen Black | | 18 | 18 | 18 | 18 | 18 | 18 |
| Atactic polypropylene | | 20 | 20 | 20 | 20 | 20 | 20 |
| Sulfur | | 1.0 | 1.0 | 1.0 | 1.0 | 1.0 | 1.0 |
| Magnesium complex of pentachlorobenzene-thiol | | 1.0 | — | — | — | — | — |
| Iron complex of 3,4,5,6-tetrachlorobenzene-1,2-dithiol | | — | 0.5 | 1.0 | 2.0 | 4.0 | — |
| Zinc complex of 4-methyl-benzene-1,2-dithiol | | — | — | — | — | — | 1.0 |
| Electric resistance (ohms) | | 120 | 105 | 130 | 125 | 125 | 120 |
| Adhesion strength of the plated layer (from the gate side) (kg/cm) | No. 1 | 2.2 | 2.7 | 2.8 | 2.9 | 2.8 | 2.3 |
| | No. 2 | 2.2 | 2.8 | 3.1 | 3.1 | 2.9 | 2.0 |
| | No. 3 | 2.3 | 2.8 | 3.1 | 3.0 | 2.9 | 2.1 |
| | No. 4 | 2.4 | 2.9 | 2.8 | 3.1 | 2.8 | 2.1 |
| Heat cycle test | | No change occurred. | | | | | |

EXAMPLES 13 TO 17

An ethylene/propylene copolymer (BJ4H, a trade name for a product of Mitsui Toatsu Chemicals, Inc.; MI 20 g/10 min.), conductive carbon black (Ketjen Black, a trade name for a product of Lion-Akzo Co., Ltd.), sulfur, a compound of general formula (2) (ethylenediaminetetraacetic acid or its 4-sodium salt), and atactic polypropylene (a product of Mitsui Toatsu Chemicals, Inc.) were mixed in the proportion shown in Table 3 by a Henschel mixer. The mixture was kneaded and pelletized by an extruder. The pellets were molded by an injection molding machine into flat plates each having a size of 80 mm×160 mm with a thickness of 2 mm. The electric resistances of these plates were measured, and the results are shown in Table 3.

Each of the flat plates was electroplated at 1 A/dm$^2$ for 5 minutes in a Watts bath at a pH of 4.2 containing 280 g/l of Ni(SO$_4$)$_2$.6H$_2$O, 50 g/l of NiCl$_2$.6H$_2$O and 45 g/l of boric acid to form a nickel-plated layer. It was further subjected to copper plating at 2.8 A/dm$^2$ for 90 minutes in a copper plating bath containing 220 g/l of Cu(SO$_4$)$_2$.5H$_2$O and 55 g/l of H$_2$SO$_4$ to obtain a copper-plated layer having a thickness of 59 μm. Four cuts each having a length of 6 cm and a width of 1 cm were made parallel to each other at intervals of 3 cm in the resulting electroplated samples, and the adhesion strength of the plated layer was measured. The results are shown in Table 3. The electroplated samples were also subjected to a heat cycle test consisting of 10 heating-cooling cycles. The results are also shown in Table 3.

COMPARATIVE EXAMPLE 3

Pellets were produced and molded into a flat plate in the same way as in Example 13 except that the amount of ethylenediaminetetraacetic acid was changed to 0.05 part. The flat plate was subjected to nickel plating and copper plating under the same conditions as in Example 13, and the adhesion strength of the plated layer was measured by the same method as in Example 13. The electroplated sample was subjected to the same heat cycle test as in Example 13. The electric resistance of the flat plate was also measured. The results are shown in Table 3.

TABLE 3

| | | Example | | | | | Comp. Example |
|---|---|---|---|---|---|---|---|
| | | 13 | 14 | 15 | 16 | 17 | 3 |
| Composition (parts by weight) | | | | | | | |
| Ethylenepropylene copolymer | | 100 | 100 | 100 | 100 | 100 | 100 |
| Carbon black | | 18 | 18 | 18 | 18 | 18 | 18 |
| Atactic polypropylene | | 20 | 20 | 20 | 20 | 20 | 20 |
| Sulfur | | 1.0 | 1.0 | 1.0 | 1.0 | 1.0 | 1.0 |
| Ethylenediaminetetraacetic acid | | 0.5 | 1.0 | 3.0 | 6.0 | — | 0.05 |
| Sodium ethylenediaminetetraacetate | | — | — | — | — | 3.0 | — |
| Electric resistance (ohms) | | 115 | 115 | 110 | 110 | 115 | 120 |
| Adhesion | No. 1 | 2.4 | 2.6 | 3.0 | 2.8 | 2.6 | 1.2 |
| strength | No. 2 | 2.3 | 2.6 | 3.8 | 2.9 | 2.7 | 1.4 |
| of the plated | No. 3 | 2.3 | 2.5 | 2.9 | 2.9 | 2.7 | 1.3 |
| layer (kg/cm; from the gate side) | No. 4 | 2.3 | 2.4 | 2.9 | 2.9 | 2.6 | 1.5 |
| Heat cycle test | | No change occurred. | | | | | |

EXAMPLES 18 AND 19

The procedure of Example 13 was followed except that diethylenetriaminepentaacetic acid or its 5-sodium salt was used in the proportions shown in Table 4 instead of ethylenediaminetetraacetic acid. The results are shown in Table 4.

EXAMPLES 20 AND 21

The procedure of Example 13 was followed except that phenylenediaminetetraacetic acid or its 4-sodium salt was used in the proportions shown in Table 4 instead of ethylenediaminetetraacetic acid. The results are shown in Table 4.

EXAMPLES 22 AND 23

The procedure of Example 13 was followed except that N,N-tetrakis-carboxymethyldiphenyl ether or its 4-sodium salt was used in the proportions shown in Table 4 instead of ethylenediaminetetraacetic acid. The results are shown in Table 4.

TABLE 4

| | | Example | | | | | |
|---|---|---|---|---|---|---|---|
| | | 18 | 19 | 20 | 21 | 22 | 23 |
| Composition (parts by weight) | | | | | | | |
| Ethylene propylene copolymer | | 100 | 100 | 100 | 100 | 100 | 100 |
| Carbon black | | 18 | 18 | 18 | 18 | 18 | 18 |
| Atactic polypropylene | | 20 | 20 | 20 | 20 | 20 | 20 |
| Sulfur | | 1.0 | 1.0 | 1.0 | 1.0 | 1.0 | 1.0 |
| Diethylenetriaminepentaacetic acid | | 3 | — | — | — | — | — |
| 5-Sodium diethylaminpentaacetate | | — | 3 | — | — | — | — |
| Phenylenediaminetetraacetic acid | | — | — | 3 | — | — | — |
| 4-Sodium phenylenediaminetetraacetate | | — | — | — | 3 | — | — |
| N,N—tetrakis-carboxymethyldiphenyl ether | | — | — | — | — | 3 | — |
| 4-Sodium salt of N,N—tetrakiscarboxymethyldiphenyl ether | | — | — | — | — | — | 3 |
| Electric resistance (ohms) | | 120 | 120 | 115 | 115 | 115 | 120 |
| Adhesion strength | No. 1 | 3.1 | 2.7 | 2.6 | 2.5 | 2.7 | 2.5 |
| of the plated layer | No. 2 | 3.2 | 2.8 | 2.7 | 2.6 | 2.7 | 2.5 |
| (kg/cm; from the | No. 3 | 3.2 | 2.7 | 2.5 | 2.6 | 2.6 | 2.6 |
| gate portion) | No. 4 | 3.1 | 2.7 | 2.7 | 2.5 | 2.6 | 2.5 |
| Heat cycle test | | No change occurred. | | | | | |

What is claimed is:
1. An electroconductive polypropylene-type resin composition comprising:
   (1) 100 parts by weight of a resin selected from the group consisting of a propylene homopolymer, an ethylene-propylene copolymer, an ethylene-propylene random copolymer rubber, an ethylene-propylene non-conjugation diene copolymer rubber and a blend of two or more of said polymers;
   (2) 10 to 60 parts by weight of carbon black,
   (3) 0.1 to 6 parts by weight of sulfur, and
   (4) at least 0.1 part by weight of one or two accelerators selected from the group consisting of (i) thiophenol derivatives of the formula:

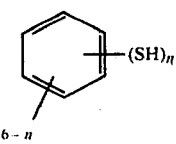

(1)

wherein X represents a hydrogen atom, a halogen atom, or a lower alkyl group and n represents an integer of 1 to 3, (ii) metal complexes of said thiophenol derivatives with at least one metal selected from the group consisting of iron, magnesium and zinc, and (iii) compounds of the formula:

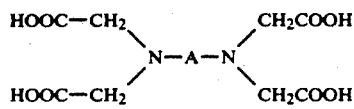 (2)

wherein A represents any one of:

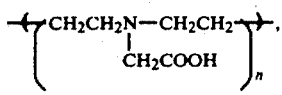 (a)

and

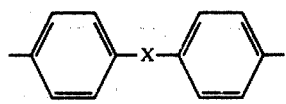 (b)

in which X represents an oxygen or sulphur atom, or methylene, imino or sulfuryl group.

2. The composition as claimed in claim 1 wherein the amount of the thiophenol derivative (i) of formula (1) added is 0.2 to 2 parts by weight.

3. The composition as claimed in claim 1 wherein the amount of the metal complex (ii) added is 0.2 to 2 parts by weight.

4. The composition as claimed in claim 1 wherein the amount of the compound (iii) of formula (2) added is 1 to 5 parts by weight.

5. The composition as claimed in claim 1 wherein the polypropylene-type resin is an ethylene/propylene copolymer, a combination of a propylene homopolymer with an ethylene/propylene random copolymer rubber, or a combination of an ethylene/propylene copolymer with an ethylene/propylene random copolymer rubber.

6. The composition as claimed in claim 1 which comprises 100 parts by weight of the polypropylene-type resin, 10 to 60 parts by weight of carbon black, 0.1 to 6 parts by weight of sulfur, 0.1 to 4 parts by weight of the accelerator, and 5 to 60 parts by weight of atactic polypropylene.

* * * * *